(12) United States Patent
Boensch et al.

(10) Patent No.: US 8,177,566 B2
(45) Date of Patent: May 15, 2012

(54) ELECTRICAL CONNECTION APPARATUS FOR CONDUCTIVE CONTACTS, IN PARTICULAR BLADE CONTACTS

(75) Inventors: Matthias Boensch, Bielefeld (DE); Klaus Holterhoff, Olpe (DE); Thorsten Beck, Bad Arolsen-Wetterburg (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 339 days.

(21) Appl. No.: 12/673,852

(22) PCT Filed: Aug. 28, 2008

(86) PCT No.: PCT/EP2008/061328
§ 371 (c)(1),
(2), (4) Date: Feb. 17, 2010

(87) PCT Pub. No.: WO2009/027483
PCT Pub. Date: Mar. 5, 2009

(65) Prior Publication Data
US 2011/0212647 A1    Sep. 1, 2011

(30) Foreign Application Priority Data

Aug. 29, 2007 (DE) .................... 20 2007 012 096 U (51) Int. Cl.
*H01R 13/44* (2006.01)
(52) U.S. Cl. .................................................. 439/135
(58) Field of Classification Search .......... 439/67, 439/77, 495, 160, 152, 607.4, 607.44, 607.55
See application file for complete search history.

(56) References Cited

U.S. PATENT DOCUMENTS

| 3,963,301 | A | * | 6/1976 | Stark .......................... 439/680 |
| 4,517,625 | A | * | 5/1985 | Frink et al. .................. 361/755 |
| 4,542,441 | A | * | 9/1985 | Perretta ....................... 361/784 |
| 7,144,256 | B2 | * | 12/2006 | Pabst et al. ................... 439/67 |
| 7,833,068 | B2 | * | 11/2010 | Bright et al. ............. 439/733.1 |
| 2005/0224109 | A1 | | 10/2005 | Posbic | |

FOREIGN PATENT DOCUMENTS

DE    202005007592    9/2005

* cited by examiner

*Primary Examiner* — Tulsidas C Patel
*Assistant Examiner* — Phuongchi Nguyen
(74) *Attorney, Agent, or Firm* — Lawrence E Laubscher, Sr.; Lawrence E Laubscher, Jr.

(57) ABSTRACT

A connector apparatus connects the flat electrical conductors of a photovoltaic panel with a plurality of insulated electrical output conductors, respectively. The terminal portions of the flat conductors are bent into electrical engagement with corresponding blade contacts mounted on the photovoltaic panel. A plurality of resilient first electrical contacts are clamped in electrical engagement with the flat conductor bent portions, respectively, and a plurality of second electrical contacts are connected with the output conductors, respectively. An electrical circuit including a plurality of diodes is connected between the first and second electrical contacts. In order to dissipate the heat generated by the diodes, the diodes are mounted on a heat conducting plate that transmits the heat toward the photovoltaic panel. A cover member formed of heat conducting material is adhesively secured to the panel to enclose the connector arrangement, thereby to also transfer the diode-generated heat to the panel.

20 Claims, 12 Drawing Sheets

ELECTRICAL CONNECTION APPARATUS FOR CONDUCTIVE CONTACTS, IN PARTICULAR BLADE CONTACTS

REFERENCE TO RELATED APPLICATIONS

This application is a continuation of International Application No. WO 2009/027483 A1 of Mar. 5, 2009, based on the PCT Application No. PCT/EP2008/061328 filed Aug. 28, 2008, and German application No. 20 2007 012 096.6 filed Aug. 29, 2007.

BACKGROUND OF THE INVENTION

1. Field of the Invention

A connector apparatus connects the flat electrical conductors of a photovoltaic panel with a plurality of insulated electrical output conductors, respectively. An electrical circuit containing a plurality of diodes is connected between the flat conductors and the insulated output conductors. In order to dissipate the heat generated by these diodes, the diodes are mounted on a heat-conducting plate that transmits the heat toward the photovoltaic panel.

2. Description of Related Art

Electricity-generating photovoltaic or solar installations generally include at least one photovoltaic panel for generating electricity from the energy of the light from the sun. Here flexible, slightly-bendable flat conductors generally extend out of the photovoltaic panels, thereby making it possible to connect the photovoltaic panels with a multiple conductor line, leading for example to a home installation or to a first to electrical apparatuses, such as an inverter or the like.

The individual flexible flat conductors are generally manually engaged by means of single clamp contact or the like, which is relatively expensive. Then a connection housing, which generally contains a certain number of diodes, is placed over the electrically-engaged flat conductor. Since the dimensions of the connection housings generally have to be relatively small, the relatively strong heat generation of these diodes presents a relatively serious problem.

The present invention was developed to find a solution to this problem. Accordingly, the diodes associated with the electronic circuit of the system are connected either directly or via at least one or more components to the surface of the photovoltaic panel in such a way that at any rate a portion of the heat generated by the diodes during the operation is dissipated into the photovoltaic panel either directly or via the connecting components.

In this way it becomes possible in a simple way to go below even relatively low limit temperatures, because the photovoltaic panel itself is used as a cooling element that absorbs the thermal energy.

SUMMARY OF THE INVENTION

Accordingly, a primary object of the present invention is to provide a connector apparatus for connecting the flat electrical conductors of a photovoltaic or solar panel with a plurality of insulated output conductors, respectively, characterized by the provision of a heat-conducting plate for transferring to the panel the heat that is generated by the diodes of the electricity generating and distributing system.

According to a more specific object of the invention, the heat-conducting plate is mounted in parallel contiguous face-to-face relation on the panel surface remote from the surface that faces the rays of the sun, the diodes of the system being directly mounted on the heat-conducting plate.

According to a further object, a support frame supports the heat-conducting plate orthogonally relative to the planar surface of the photovoltaic panel, whereby heat from the diodes is transmitted to the panel by the heat-conducting plate and by the support frame.

Another object of the invention is to provide a cover member formed of heat conducting material, said cover member being adhesively secured to the panel so as to enclose the connector arrangement, thereby further to transfer the diode-generated heat to the panel.

In accordance with a more specific object, the terminal portions of the flat conductors are bent into electrical engagement with corresponding blade contacts mounted on the photovoltaic panel. A number of resilient first electrical contacts are clamped in electrical engagement with the flat conductor bent portions, respectively, and a plurality of second electrical contacts are connected with the output conductors, respectively. An electrical circuit including a plurality of diodes is connected between the first and second electrical contacts. In order to dissipate the heat generated by the diodes, the diodes being mounted on a heat conducting plate that transmits the heat toward the photovoltaic panel.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
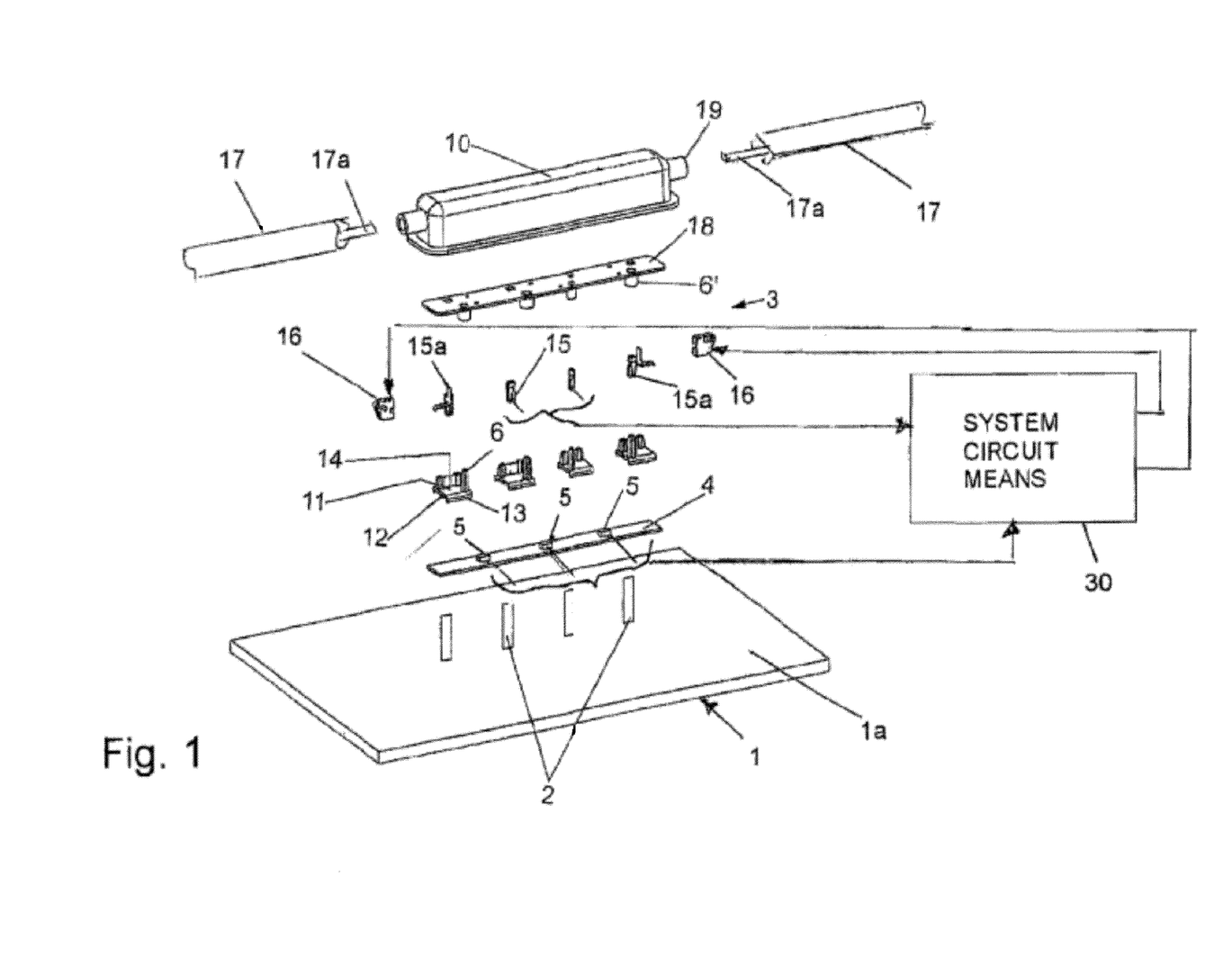
FIG. 1 is an exploded perspective view of the flat conductor connector apparatus of the present invention.
Figure 2:
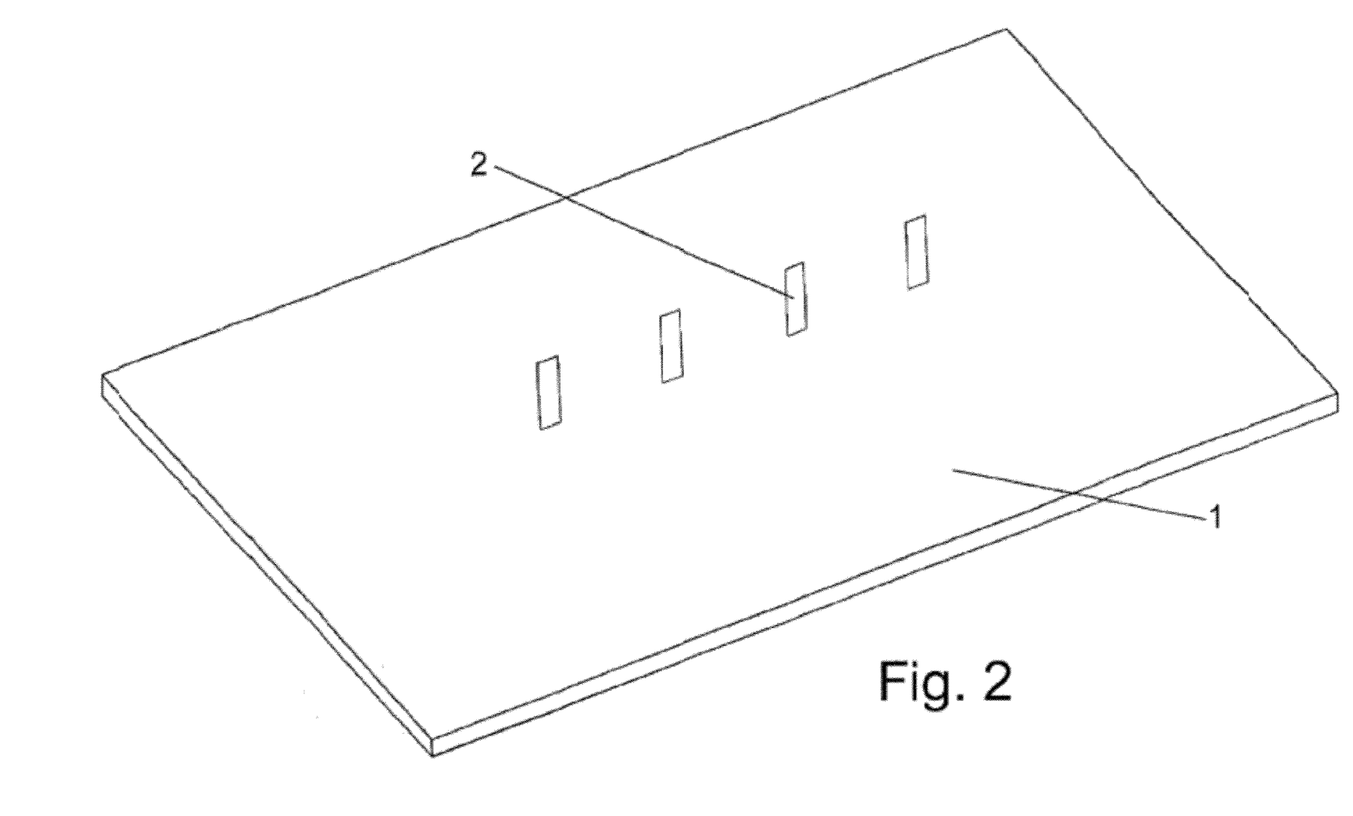
FIGS. 2-6 are perspective views illustrating the steps for assembling the components of FIG. 1.
Figure 3:
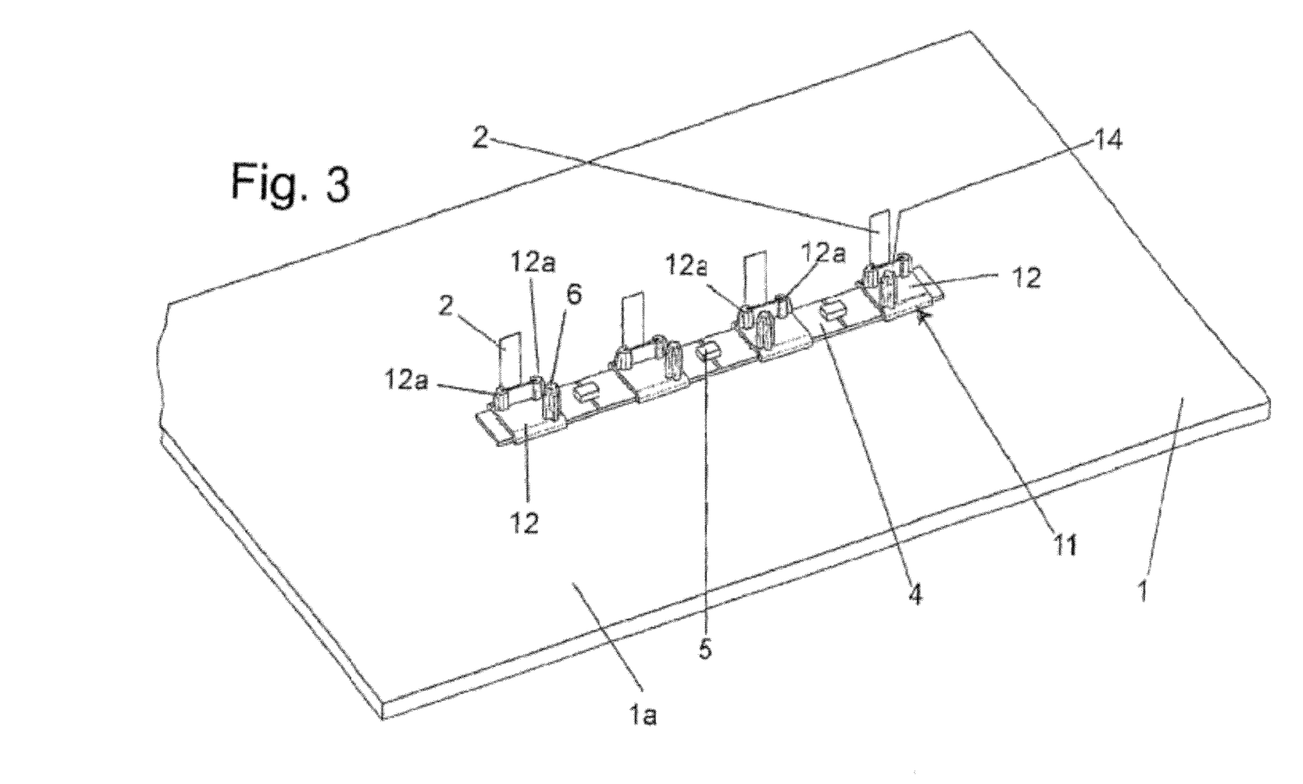

Referring first more particularly to FIG. 1, the connector apparatus 3 of the present invention serves to connect a plurality of insulated output conductors 17 with the flat conductors 2 that extend upwardly from the planar upper surface 1a of a generally horizontal photovoltaic or solar panel 1 (FIG. 2). This surface is on the opposite side from the surface that is exposed to the light energy of the sun. According to a characterizing feature of the invention, a horizontal heat-conducting plate 4 is adhesively connected, preferably by a heat-conducting adhesive material, in contiguous surface-to-surface contact with the panel planar surface 1a (FIG. 3). This heat-conducting plate 4 serves to transmit to the photovoltaic panel 1 the heat generated by diodes 5 that are adhesively mounted on the plate. These diodes are electrically connected within electronic circuit means 30 (for example, an inverter circuit) of the electricity generating and distributing system.

Figure 4:
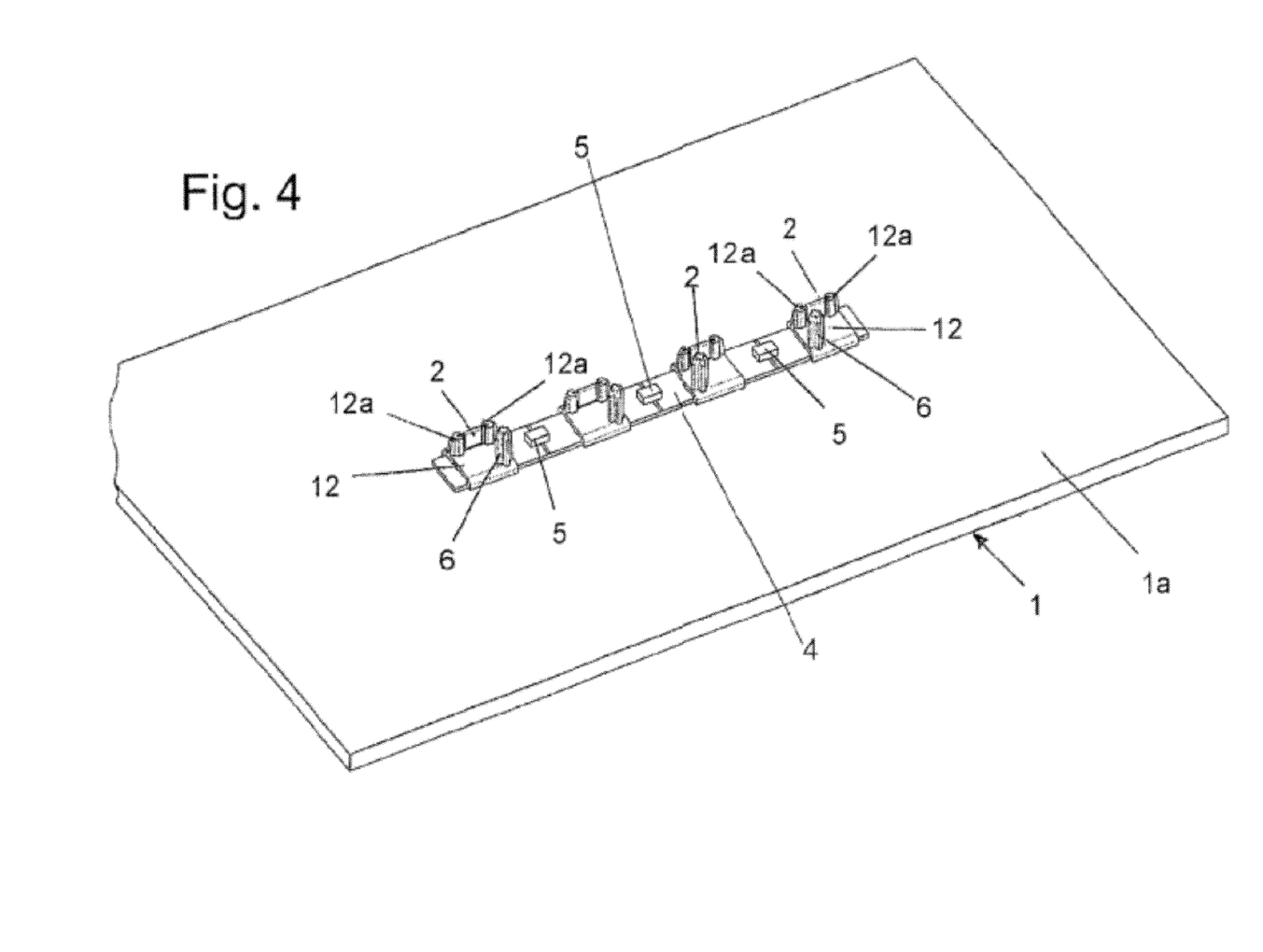
Figure 7:
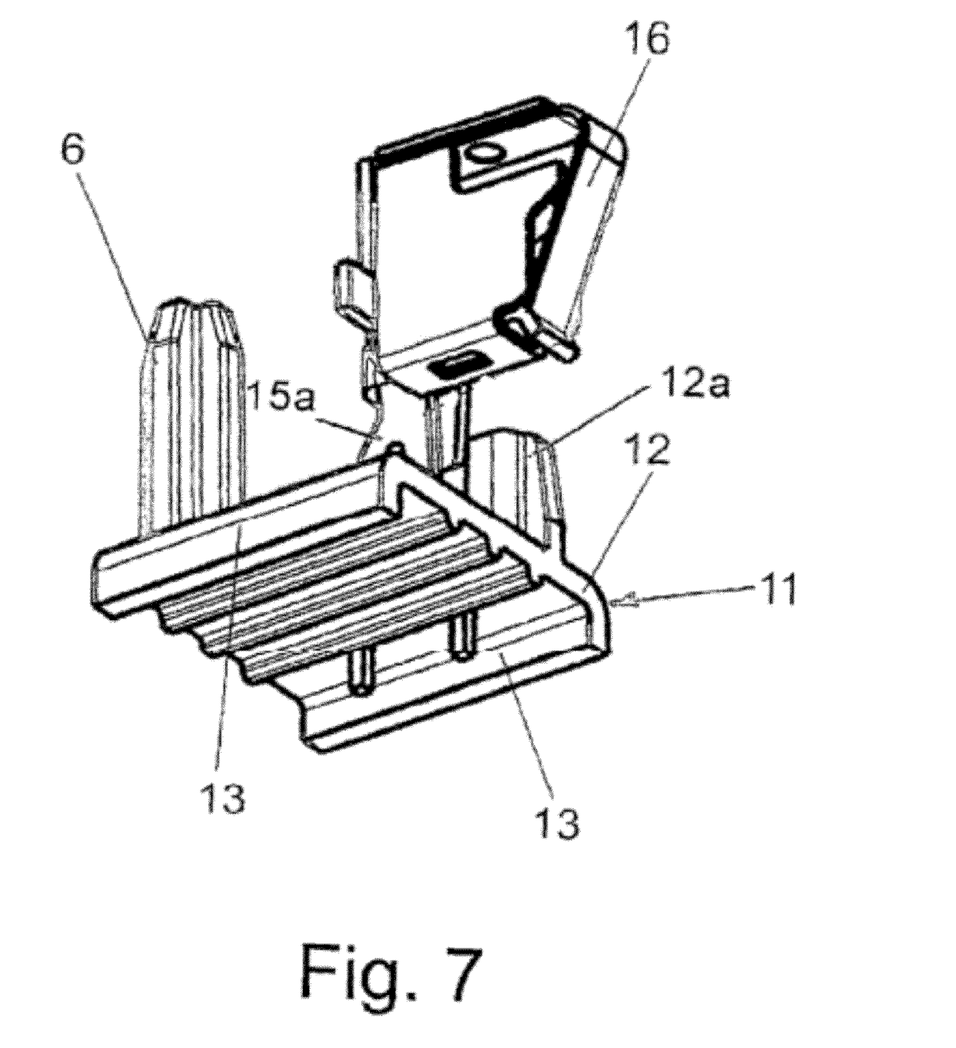
FIG. 7 is an exploded bottom perspective view of the blade contact mounting device of FIG. 4.
Figure 8:
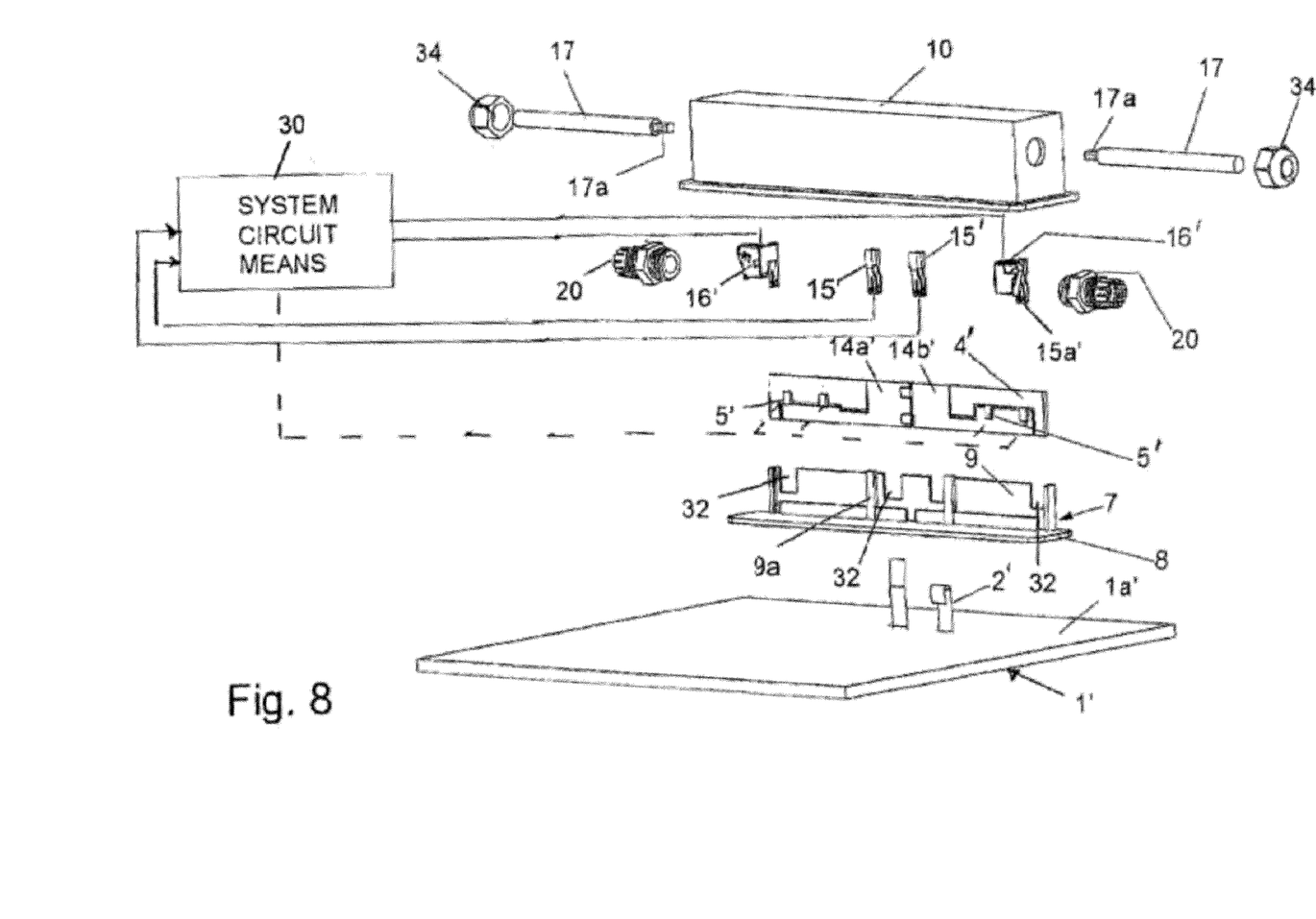
FIG. 8 is an exploded view of a second embodiment of the present invention.

A plurality of linearly-arranged vertical blade contacts 14 are mounted on the panel adjacent the flat conductor ends 2, respectively, by blade mounting means 11 including base portions 12 having a pair of resilient spaced parallel downwardly directed integral flange portions 13 (FIG. 7) that are fastened to opposite edges of the heat-conducting plate 4. Each of the blade contacts is supported between spaced vertical integral post portions 12a that extend upwardly from the base portion 12 of the associated mounting device. As shown in FIG. 4, the terminal end portions of the flat conductors 2 are bent downwardly about, and in electrical engagement with, the upper edges of the blade contacts 14. Resilient bifurcated electrical contacts 15, 15a (FIG. 5) are then displaced downwardly toward clamped electrical engagement with the reversely bent portions of the flat conductors 2, and one-way locking output contacts 16 are mounted on the end contacts 15a. The electronic circuit 30 containing the diodes 5 is connected between the first and second contacts 15 and 16.

Figure 5:
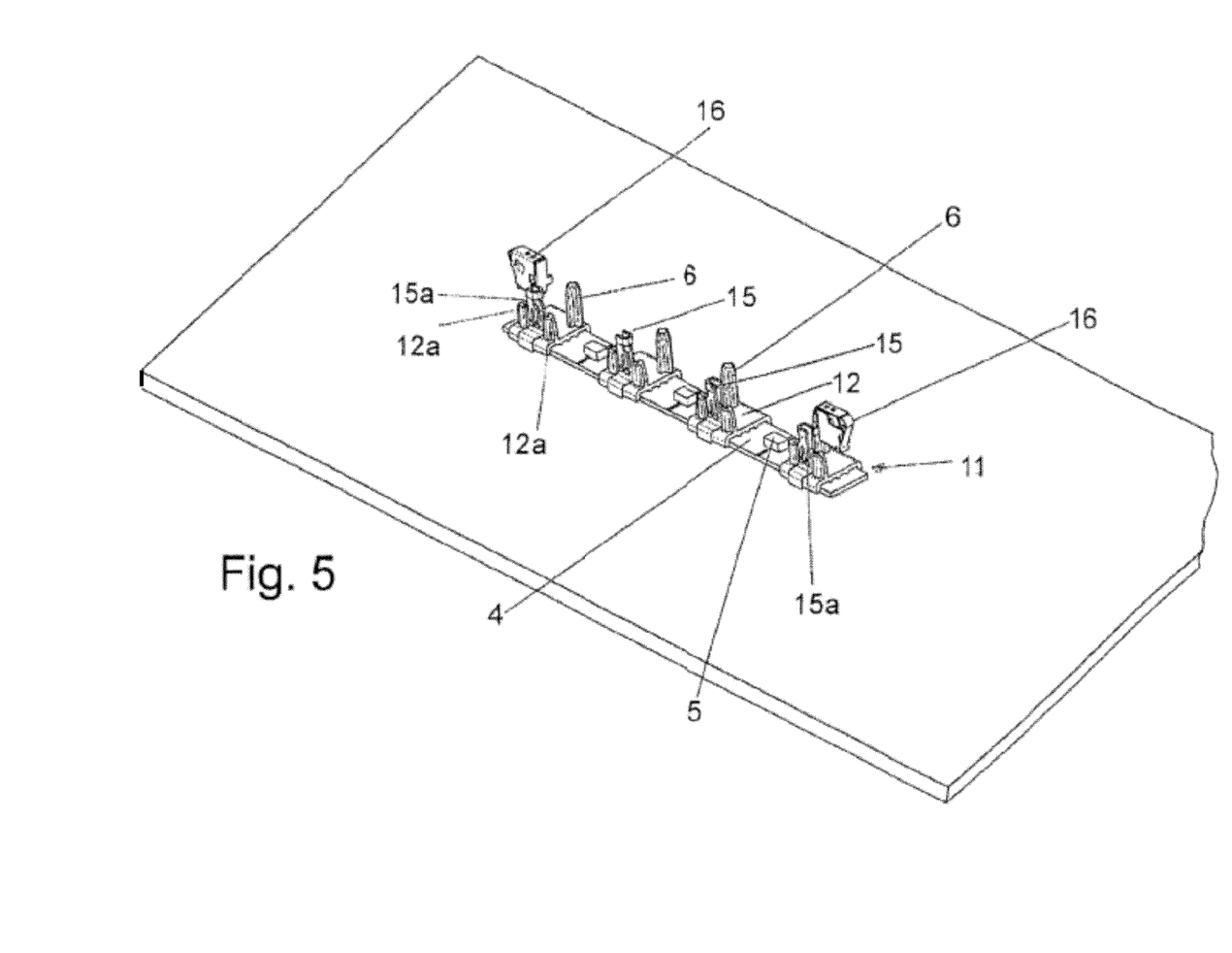
Figure 6:
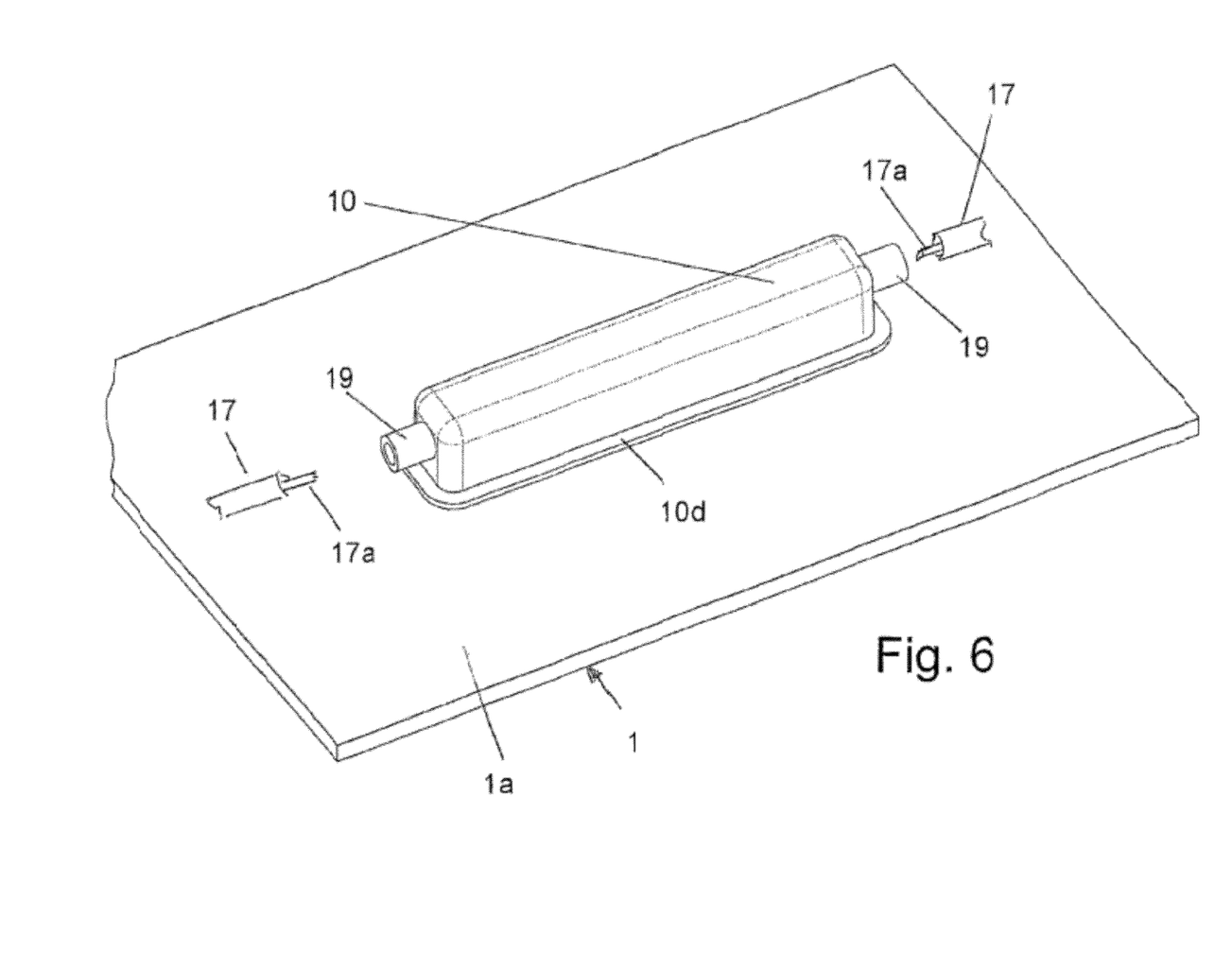

A cover member 10 formed from a heat-conducting synthetic plastic material is mounted downwardly to enclose the assembly of FIG. 5, said cover member including top 10a, end 10b and side walls 10c that cooperate to define a chamber for receiving the connector assembly of FIG. 5. An assembly plate 18 is mounted within the cover chamber, said assembly plate having a plurality of female guide members 6' that receive corresponding upwardly extending alignment pins 6 on the blade contact means 11. The lower flange portion 10d of the end and side walls of the cover member 10 is adhesively fastened to the upper panel surface 1a, preferably by a heat-transmitting adhesive material. The bare stripped ends 17a of the insulated conductors 17 are then inserted into the cover chamber via integral input support sleeves 19 that communicate with openings contained in the end walls of the cover member. The bare conductor end portions are inserted in locking engagement with the one-way locking contacts 16 (in a manner described below in connection with FIG. 10 of the second embodiment). Consequently, in this embodiment, the heat from the diodes is transmitted to the panel 1 via the heat-conducting plate 4, and also via the surrounding protective cover member 10.

Figure 9:
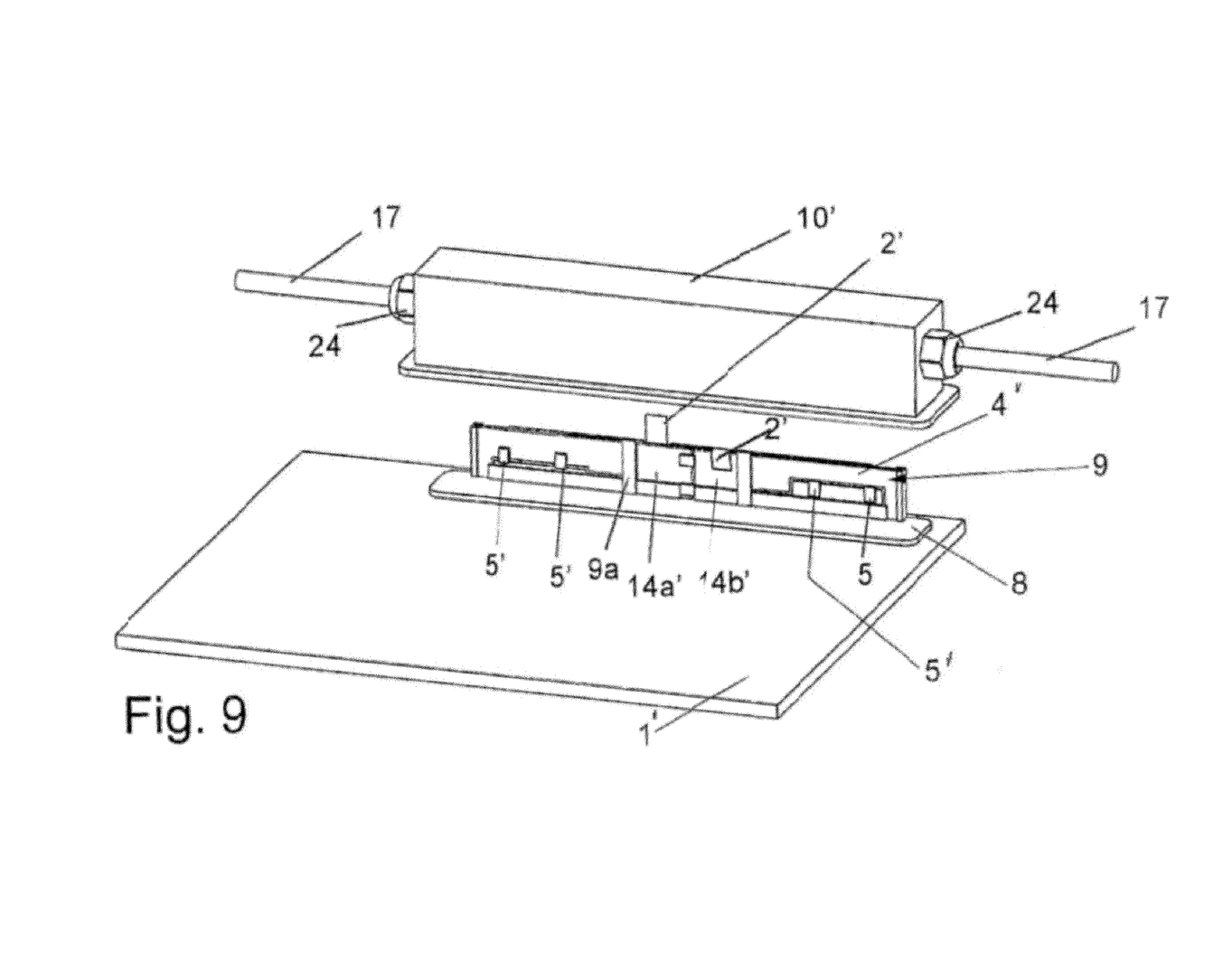
FIGS. 9-11 are perspective views illustrating the assembly steps of the connector apparatus of FIG. 8.
Figure 10:
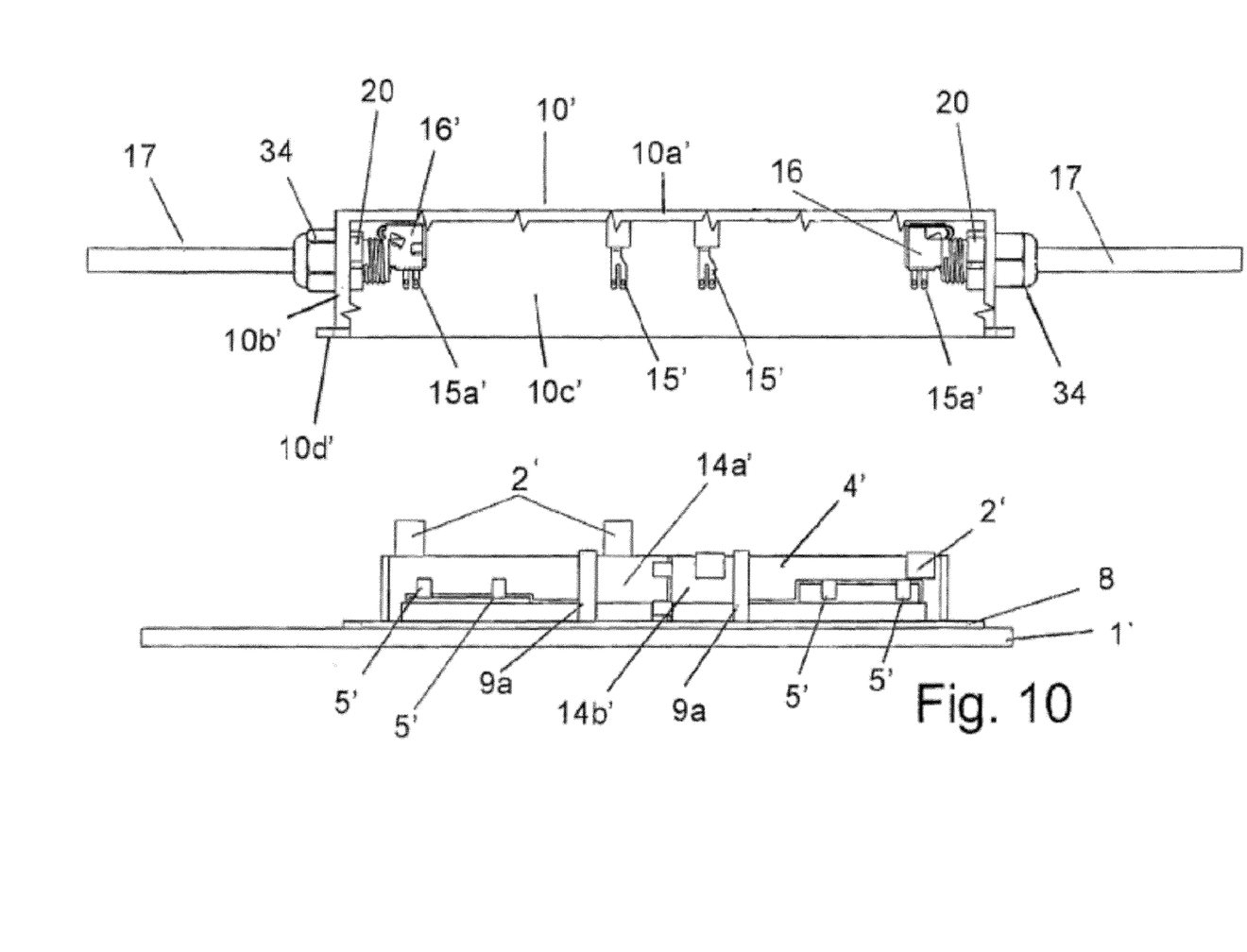
Figure 11:
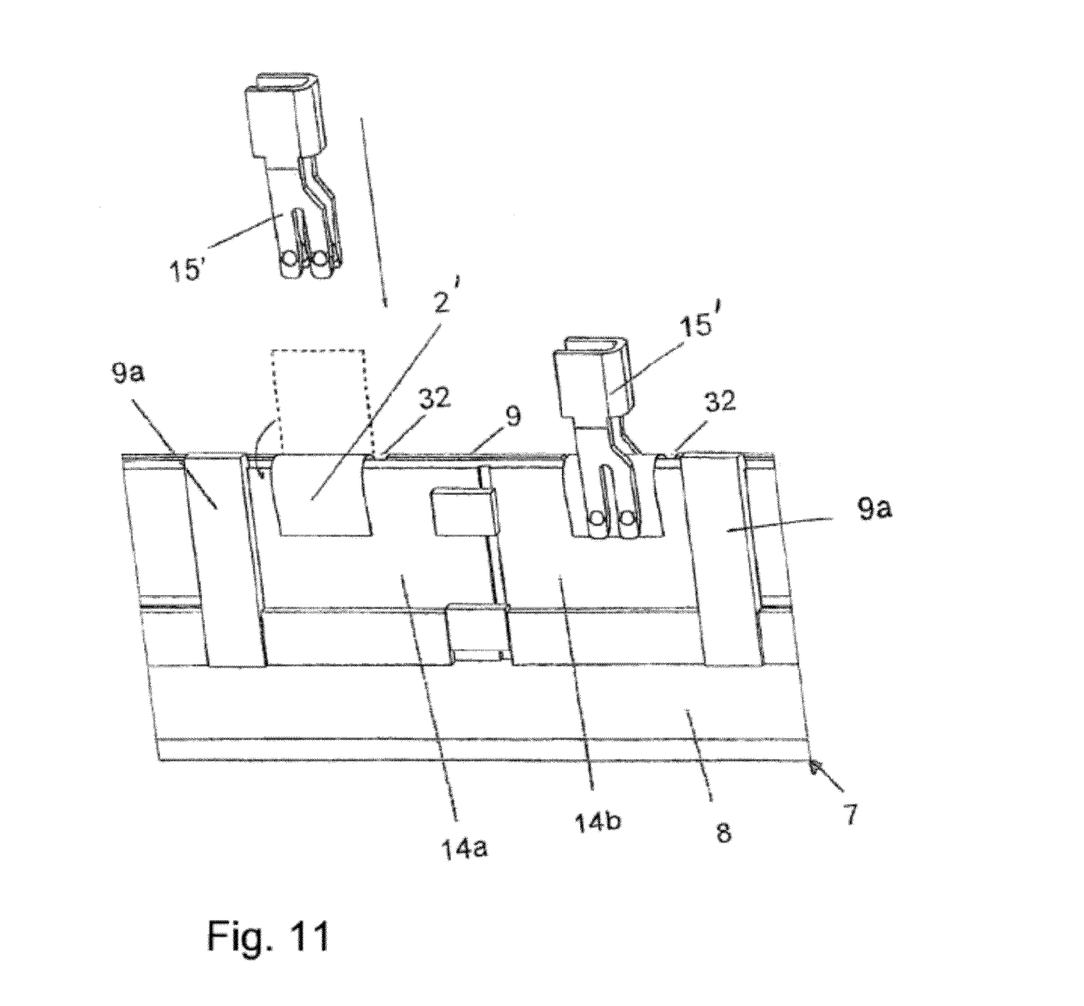
Figure 12:
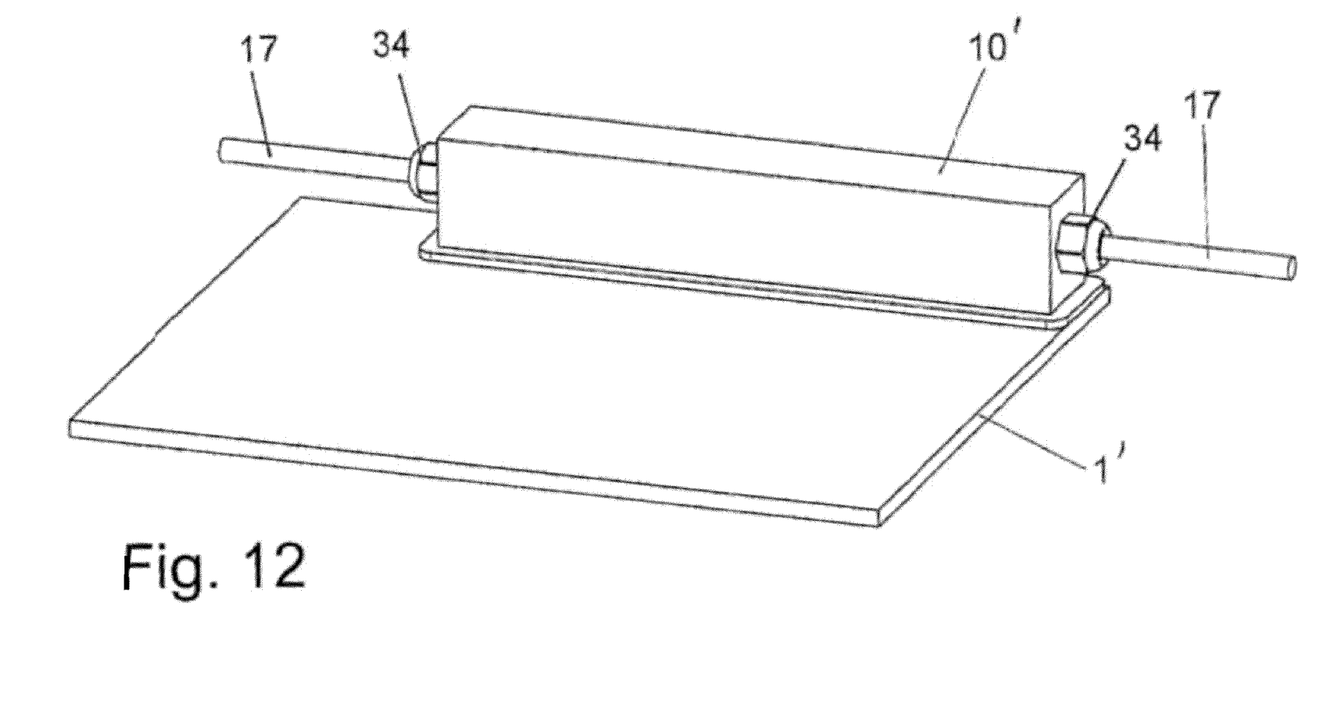
FIG. 12 is a perspective view of the fully assembled apparatus of FIG. 8.

According to the second embodiment of the invention shown in FIGS. 8-12, the heat-conducting plate 4' is supported by a support frame 7 to have a vertical orientation relative to the horizontal planar surface 1a' of the photovoltaic panel 1'. The support frame 7 is formed from a heat-conducting synthetic plastic material and includes a horizontal base portion 8 that is secured—preferably by a heat-conductive adhesive—to the upper panel surface 1a' adjacent the flat conductors 2'. The support frame includes a vertical portion 9 and a plurality of spaced vertical fingers 9a that cooperate to support there between the heat conducting plate 4' upon which are mounted the diodes 5' and the blade contacts 14a' and 14b'. The upper edge portion of the frame vertical portion 9 contains a plurality of vertical access slots 32 opposite the flat conductors, respectively, such that the upper ends of the flat conductors 2 may be bent reversely about, and in electrical engagement with, the corresponding blade contacts (FIGS. 9 and 10). When the cover member is seated on the panel upper surface 1a' (FIG. 12), resilient bifurcated contacts 15', 15a' carried by the bottom surface of the cover top wall 10a' are brought into clamped electrical engagement with the reversely-bent portions of the flat conductors 2', as best shown in FIG. 11. The end walls 10b' of the cover member 10' contain openings in which are mounted tubular support sleeves 20 that are fastened to the cover member by locking nuts 34. Thus the conductors 17 extend through the support sleeves with the stripped bare conductor ends inserted longitudinally into the one-way contacts 16' that are mounted on the resilient bifurcated end contacts 15a'.

Consequently, in this embodiment, the heat from the diodes 5' is transmitted to the photovoltaic panel 1' via the heat-conducting plate 4', and the support frame 7, and also by the housing 10'.

In the embodiment of FIG. 1, the heat-conducting plate 4 is attached directly on the surface (here relative to the incident sun light on the opposite backside surface) of the solar panel on which one or more diodes 5 are arranged.

In this way it is possible to use the solar panel itself to absorb and dissipate a portion of the heat that is generated during the operation of the at least one or of the multiple diodes 5. Thus it becomes possible to keep the operating temperature of the connection device below the given limit values to be respected.

According to FIG. 1, the flat conductor plate 4 is applied flat on the surface of the photovoltaic panel 1, so that direct heat conduction is achieved in the area of the entire conductor plate surface, from the conductor plate 4 in to the photovoltaic panel 1. To increase the heat conductivity, it is conceivable to introduce a means which conducts heat well, for example, a heat conducting adhesive which conducts heat well, between the conductor plate 4 and the photovoltaic panel 1.

It is also conceivable to arrange the conductor plate 4, not in parallel, but at an arbitrary angle, particularly a right angle, with respect to the photovoltaic panel, or a single-piece or multi-piece conductor plate arrangement which in itself is angled, forming, for example, a right angle in cross section.

The advantage of these arrangements are that, on the one hand, direct heat conduction from the conductor plate into the photovoltaic panel occurs, and, on the other hand, the area that protrudes at an angle from the photovoltaic panel is also used for the purpose of radiating heat into the ambient air like cooling ribs.

Complementary measures can contribute to further optimize the heat dissipation of the diodes 5. They include the use of a conductor plate 4 with a metal coating on one side, or on two sides to the extent possible. It is also conceivable to provide radiating ribs on the conductor plate 4. Finally, it is conceivable to manufacture the connection housing 10, which is placed over the internal components of the connection device, from a conducting plastic, or to provide said housing with openings that are closed with an air-permeable, for example, a membrane-like, material (not shown here).

The diodes 5 themselves can be arranged on the conductor plate 4 using a different technique, for example the SMD technique.

The contacting of the flat conductor ends 2, and the realization of a conducting connection between the flat conductor ends 2 and the diodes 5, can also be achieved in different ways.

The cover housing 10 can be provided directly in its interior or on an assembly plate 18 with the resilient bifurcated contact clamps 15, which are designed, in the interaction with the blade contacts 14, in each case as first connecting contacts for the purpose of firmly clamping the flat conductor ends 2, which had been bent over the blade contacts 14, to said contacts, to ensure a connection that conducts well. The connection housing can be glued at a flange to the photovoltaic panel.

The blade contacts 14 are connected preferably by means of a conducting connection to the conductor plate 4, in such a way that a continuously conducting connection with the diodes 5 is achieved.

The possibility exists to connect several contact clamps 15, in this instance the outer contact clamps of the small arrangement, which here has an overall longitudinal extension, by means of a conducting connection to the connecting contacts 16 for the connection of external conductors 17. The external conductors can be introduced through conductor support sleeves 19 and 20 of the connection housing into said housing. It is advantageous, although not necessary, to design the connecting contacts 16 as push-in direct plug clamps.

In this way, an easily handled, quickly installed, connection device can be produced, which is a small construction that nevertheless respects all the relevant temperature limit values in a simple way.

The contacting of the conductor plate 4 of the arrangement from FIGS. 6-12 occurs similarly to the contacting of the conductor plate of FIGS. 1 to 8. However, it is possible here to attach blade contacts to the conductor plate 4 itself, or to use the conductor plate marginal area itself as blade contacts. The contacting itself is produced again with contact clamps 15 and a connection housing 10, which moreover is constructed either entirely or largely according to the connection housing type of FIG. 1. The connection housings can also be provided with threadably connected support sleeves 20 for the conductors that are to be connected.

While in accordance with the provisions of the Patent Statutes the preferred forms and embodiments of the invention have been illustrated and described, it will be apparent to those skilled in the art that changes may be made without deviating from the invention described above.

What is claimed is:

1. Connector apparatus for connecting the flat electrical conductors (2) of a photovoltaic panel (1) with a plurality of insulated electrical output conductors (17), respectively, comprising:
   (a) a photovoltaic panel (1) having a generally horizontal upper planar surface (1a), and a plurality of flexible flat conductors (2) extending from said panel planar surface;
   (b) a plurality of blade contacts (14; 14');
   (c) blade contact mounting means (7, 11) mounting said blade contact means on said panel planar surface adjacent said flat conductors, respectively, said flat conductors having terminal portions that are bent into contiguous electrical engagement with said blade contacts, respectively;
   (d) a plurality of first electrical contacts (15, 15a) in electrical engagement with said flat conductor bent portions, respectively;
   (e) a plurality of second electrical contacts (16) adapted for connection with the output conductors, respectively;
   (f) electrical circuit means (30) connected between said first and second electrical contacts, said circuit means including a plurality of diodes (5); and
   (g) heat dissipating means for transmitting the heat generated by said diodes toward said photovoltaic panel.

2. Connector apparatus as defined in claim 1, wherein said heat dissipating means comprises a heat-conducting plate (4; 4') formed from a heat-conducting material, said diodes being fastened to said heat-conducting plate.

3. Connector apparatus as defined in claim 2, wherein said heat-conducting plate is formed from a heat-conducting synthetic plastic material.

4. Connector apparatus as defined in claim 3, wherein said heat-conducting plate is at least partially covered with a metalized coating.

5. Connector apparatus as defined in claim 2, wherein said blade contact mounting means comprises a plurality of mounting members (11) each including:
   (1) a horizontal base portion (12) seated on said heat-conducting member;
   (2) a pair of spaced resilient flange portions (13) extending downwardly from said base portion in snap-fastening engagement with said heat-conducting plate, thereby to fasten said mounting member to said plate; and
   (3) connecting means (11a) connecting one of said blade contacts to said mounting member in vertical orientation relative to said base portion.

6. Connector apparatus as defined in claim 5, and further including:
   (h) a cover member (10) having top, end and side walls defining a downwardly directed chamber, said cover member being fastened to said photovoltaic panel upper surface with said mounting members and said blade contacts being contained in said cover chamber; and
   (i) positioning means (6, 6', 18) for positioning said blade contact mounting members at spaced positions within said cover chamber.

7. Connector apparatus as defined in claim 6, wherein said positioning means comprises a centering pin (6) on each of said mounting members, and a corresponding female receptacle (6') carried by said cover member.

8. Connector apparatus as defined in claim 2, wherein said heat-conducting plate is parallel with, and fastened in contiguous surface-to-surface heat-conducting relation to, said photovoltaic panel planar surface.

9. Connector apparatus as defined in claim 8, wherein said heat-conducting plate is adhesively fastened to said panel planar surface.

10. Connector apparatus as defined in claim 8, wherein said heat-conducting plate is fastened to said panel planar surface by a heat-conducting adhesive.

11. Connector apparatus as defined in claim 2, wherein said heat-conducting plate
is angularly arranged relative to said panel planar surface.

12. Connector apparatus as defined in claim 11, wherein said heat-conducting plate is orthogonally arranged relative to said panel planar surface.

13. Connector apparatus as defined in claim 12, wherein said blade contact mounting means comprises:
   (h) a support frame (7) supporting said heat-conducting plate orthogonally relative to said panel planar surface, said support frame being formed from a heat-conducting material and including:
      (1) a base portion (8) having a generally horizontal bottom surface fastened to said photovoltaic panel planar surface adjacent said flat conductors;
      (2) a vertical portion (9) that extends orthogonally upwardly from said base portion; and
      (3) means (9a) connecting said heat-conducting plate with said frame vertical portion.

14. Connector apparatus as defined in claim 13, wherein said blade contacts (14') are mounted on said heat conducting plate, said heat-conducting plate containing a plurality of access openings (32) opposite said flat conductors, respectively, thereby to afford electrical engagement between said flat conductors and said blade contacts.

15. Connector apparatus as defined in claim 2, wherein said first contacts (15) comprise bifurcated resilient contacts each having a pair of arm portions biased toward clamping engagement with said flat conductor bent portions, respectively.

16. Connector apparatus as defined in claim 15, wherein said second contacts (16) comprise one-way self-locking contacts adapted to receive the bare ends of the associated insulated output conductors, respectively.

17. Connector apparatus as defined in claim 16, and further including:
   (h) a cover member (10;10') having top, end and side walls defining a downwardly directed chamber, said cover member being fastened to said photovoltaic panel upper surface with said mounting members and said blade contacts being contained in said cover chamber, at least one of said cover member end walls containing an opening for receiving the associated insulated output conductor, one of said second contacts (16) being mounted in said cover chamber adjacent said end wall opening.

18. Connector apparatus as defined in claim 17, wherein said first contacts are mounted on the bottom surface of said housing top wall.

19. Connector apparatus as defined in claim 17, and further including:

(i) a support sleeve (20) threadably mounted in said housing end wall opening for supporting the insulated output conductor relative to said cover member.

20. Connector apparatus as defined in claim 17, wherein said cover member is formed from a heat-conducting material.

* * * * *